Figure 1:
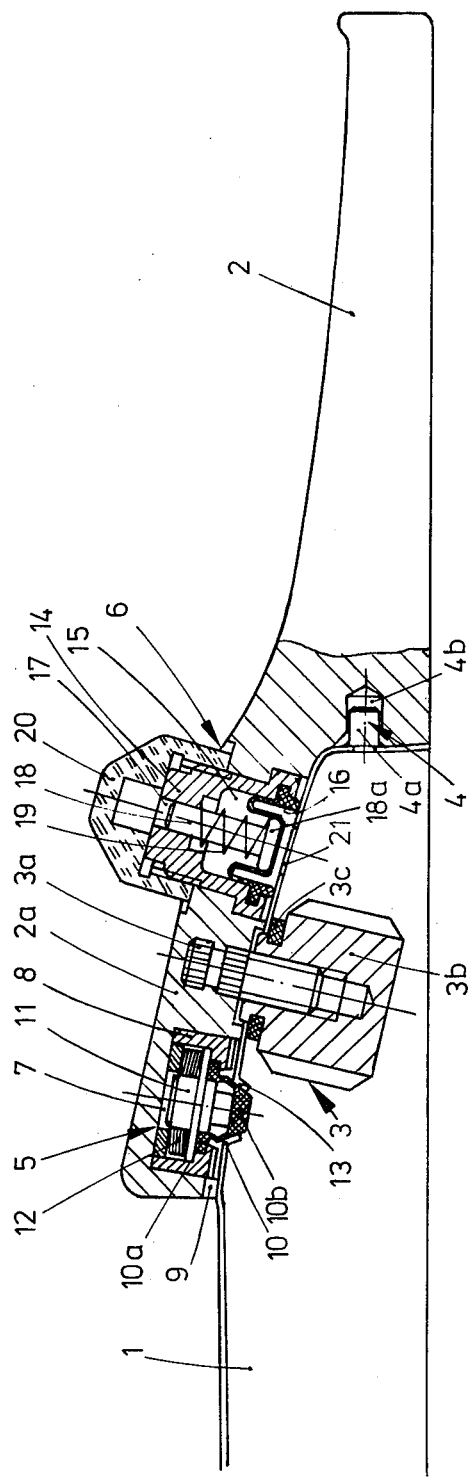

United States Patent [19]

Bauer

[11] 4,330,069
[45] May 18, 1982

[54] STEAM PRESSURE COOKER

[75] Inventor: Edwald Bauer, Geislingen, Fed. Rep. of Germany

[73] Assignee: Wurttembergische Metallwarenfabrik, Steige, Fed. Rep. of Germany

[21] Appl. No.: 223,038

[22] Filed: Jan. 7, 1981

[30] Foreign Application Priority Data

Jan. 22, 1980 [DE] Fed. Rep. of Germany ....... 3002204

[51] Int. Cl.³ .............................................. B65D 51/16
[52] U.S. Cl. ..................................... 220/203; 220/316
[58] Field of Search ............... 220/203, 206, 303, 316, 220/293, 295, 231, 367

[56] References Cited

U.S. PATENT DOCUMENTS 3,973,694 8/1976 Tess ...................................... 220/206
4,251,007 2/1981 Behnisch .............................. 220/316

Primary Examiner—George T. Hall
Attorney, Agent, or Firm—Arnold, White & Durkee

[57] ABSTRACT

A steam pressure cooker having a lid with a retainer body, such as a grip member or a valve housing for containing safety and monitoring devices releasably affixed thereto by means of a sealed fastener element. For protection of said devices against contamination from inside or outside the cooker, such as during cleaning thereof, all of said devices are located in cavities formed in said retainer body and sealed against the interior of the cooker, said sealing being accomplished by means of a diaphragm. The fastener element is releasable independently of the remaining components.

15 Claims, 4 Drawing Figures

U.S. Patent   May 18, 1982   Sheet 3 of 3   4,330,069

STEAM PRESSURE COOKER

DESCRIPTION

This invention relates to a steam pressure cooker of the type set forth in the introductory clause of claim 1.

It has been found that the safety and monitoring devices provided on a pressure cooker or the lid thereof, respectively, as a necessity for cooking with steam pressure offer certain difficulties to many housewives in connection with cleaning of the cooking utensils. Valves or pressure gauges through which the steam flows tend to become clogged by fats and other food components, so that their function may be hampered. Deposits may also form between fixedly attached grip members and the lid or the cooker itself, from where they can only be removed after unscrewing the grip member. Thorough cleaning of the cooker thus requires disassembly and reassembly thereof before and after cleaning, these operations usually requiring the employ of suitable tools. The complexity of these operations and the fear of not being able to properly reassemble the individual components result in such cleaning being performed very infrequently if at all.

A pressure cooker described in DE-AS No. 23 52 389 and of the type set forth in the introductory clause of claim 1 comprises a grip handle attached to a lid and extending over a part thereof, a safety valve with means for adjusting its release pressure, a pressure indicator and a safety locking device being supported in said grip handle. The grip handle is retained on the lid by means of an annular nut threaded onto an outer thread of the pressure indicator housing from the inside of the lid. Fitted onto the annular nut is the foot portion of an elastic rubber cap insulating the pressure indicator from the interior of the cooker. The safety valve comprises a lid opening engaged by a valve cone supported by one end of an elongate crank-shaped torsion spring. The other end of the torsion spring is supported within the grip handle and adapted to be adjustably biased by means of a pivotable segment therein. The pivotable segment itself is moved by a slide member having an actuating nose projecting upward through a lid opening. The recess in the lid handle is closed inwardly by a guide plate for the slide member. The safety valve with the lid opening, the valve cone and the end of the torsion spring carrying the latter are located in an outwardly opening cavity of the grip portion extending over the lid. Towards the interior of the grip handle, this cavity is closed by a filler insert defining a channel in which a section of the torsion spring is rotatably retained. As rotation of the torsion spring requires the existence of a certain play between it and the channel, the filler insert does not provide a completely tight seal to atmosphere. During relief of the safety valve, a part of the escaping steam as well as foodstuff particles carried therein may penetrate into this channel. Likewise, on cleaning of the lid, the cleaning liquid may penetrate into the grip handle to contaminate the movable elements mounted therein. Subsequent drying of the interior of the handle requires not only removal of the hnadle from the grip but also disassembly of the main components. Removal of the handle from the lid, such as for cleaning the contacting surfaces and the cavity surrounding the safety valve, requires unscrewing of the annular nut together with the rubber cap fitted thereon, resulting in considerable wear with consequent reduction of its service life span. It is therefore an object of the present invention to provide a steam pressure cooker of the type set forth in the introduction, wherein the safety and monitoring devices are reliably protected from contamination, and wherein the retainer body is readily removable for cleaning and the like.

This object is attained by the features set forth in the characterizing clause of claim 1.

In accordance with the invention, the safety and Monitoring devices are reliably protected from contamination both with the retainer body being affixed to the lid and with the retainer body being removed for cleaning of the contacting surfaces. Disassembly of the respective components is neither necessary nor even possible. Their function is thus not hampered by contamination nor by the possibility of incorrect assembly after cleaning. Frequent cleaning of the contacting surfaces between the retainer body and the lid may be readily carried out by merely releasing and refastening of the separate fastener element, so that the housewife is not faced with any technical difficulties.

The safety and monitoring devices may be sealed in a simple manner by the employ of individual diaphragms, ensuring a reliable seal towards the interior of the cooker while enabling pressure to be transmitted. Since they do not have to removed for cleaning, even if the retainer body is dismounted, they may be fixedly connected to suitable components of the respective device to be safely retained thereby. Moreover, the diaphragms are not subjected to any particular loads.

In a preferred embodiment of the invention, the pressure cooker comprises a safety valve including a diaphragm fixedly connected to the retainer body and adapted to be brought into pressure contact with a valve seat by means of a valve plunger slidably disposed in a sealed cavity and biased by a force storage means. The cavity containing the plunger and the force storage means is safely sealed by the diaphragm in any position of the safety valve. On response of the valve to overpressure within the cooker, the escaping steam flows only along the outside of the diaphragm. During cleaning of the lid, the cleaning liquid is prevented from penetrating into the cavity. The same applies if the retainer body is removed from the lid.

In an advantageous embodiment, the diaphragm may be fixedly connected to a bushing fixedly inserted in the housing and forming the cavity. This facilitates assembly during production and prevents the diaphragm from being removed during use of the cooker.

In another embodiment the diaphragm is fixedly attached to a valve cone at the side thereof facing away from the interior of the cooker, resulting in similar advantages with respect to assembly and use. In addition, the valve cone protects the diaphragm from immediate contact with the hot steam escaping on release of the valve.

A steam pressure cooker according to the invention further comprises a pressure indicator including a cavity formed in the retainer body adjacent the outer lid surface and sealed by a diaphragm communicating with the interior of the cooker through a lid opening with which it is engaged by a spring-biased indicator pin disposed inside the cavity, so as to transmit the pressure from the interior of the cooker to said pin. In the known steam pressure cooker discussed in the introduction, the interior pressure of the cooker is also transmitted to the plunger of a pressure indicator through a diaphragm, i.e. through a rubber cap. In this construction, however, the rubber cap projects freely into the cooker, so that it is subjected to severe conditions during cooking as well as during cleaning of the opened lid. In an advantageous embodiment of the invention, the diaphragm of the pressure indicators is essentially protected by being retracted into the retainer body. On removal of the lid and cleaning thereof, the diaphragm closes the pressure-transmitting lid opening under the pressure of the spring biasing the indicator pin. If a pressure increase causes the diaphragm to lift off from the lid opening and its closest vicinity, small amounts of grease may be able to enter this space and to form a deposit in the course of time. This deposit may be readily removed, however, after releasing the fastener element and removing the retainer body for cleaning of the contact surfaces. In operation the fastener element keeps the diaphragm in tight engagement with the lid, so that the lid opening is reliably sealed against atmosphere at any pressure.

A further protection of the pressure indicator against the entering of foreign matter, cleaning liquid and the like is achieved by closing a bushing containing the indicator pin with a transparent cap on the upper side of the lid. At the same time this cap prevents the houswife from trying to clean the pressure indicator from this side or to disassemble it.

Further the steam pressure cooker according to the invention may comprise a temperature sensor projecting into the interior of the cooker and connected to a temperature indicator at the outside of the lid, in combination with a seal adjacent a recess facing towards the interior of the cooker. The temperature sensor thus also constitutes a fixedly installed component of the safety and monitoring devices not subjected to contamination. In a structurally advantageous manner the temperature sensor may be retained in a hollow stud member of the grip handle projecting through a lid opening so as to act as a fixing element.

In a steam pressure cooker the fastener element of which is formed by a threaded bolt and a nut cooperating therewith, the bolt may be fixedly attached to the retainer body, the nut being adapted to be threaded thereon, together with a seal, from the interior of the cooker. The nut is advantageously dimensioned such that it may be readily unscrewed without the employ of a tool to facilitate removal of the retainer body for cleaning or replacement.

In another embodiment the bolt may be fixedly attached to the lid so as to project outwards thereof, in which case the nut may be non-separably connected to the retainer body, so that the retainer body is lifted off be unscrewing the nut. This offers the advantage that upon premature releasing of the nut any residual pressure remaining within the cooker may safely escape without any component being blown off thereby.

Figure 2:
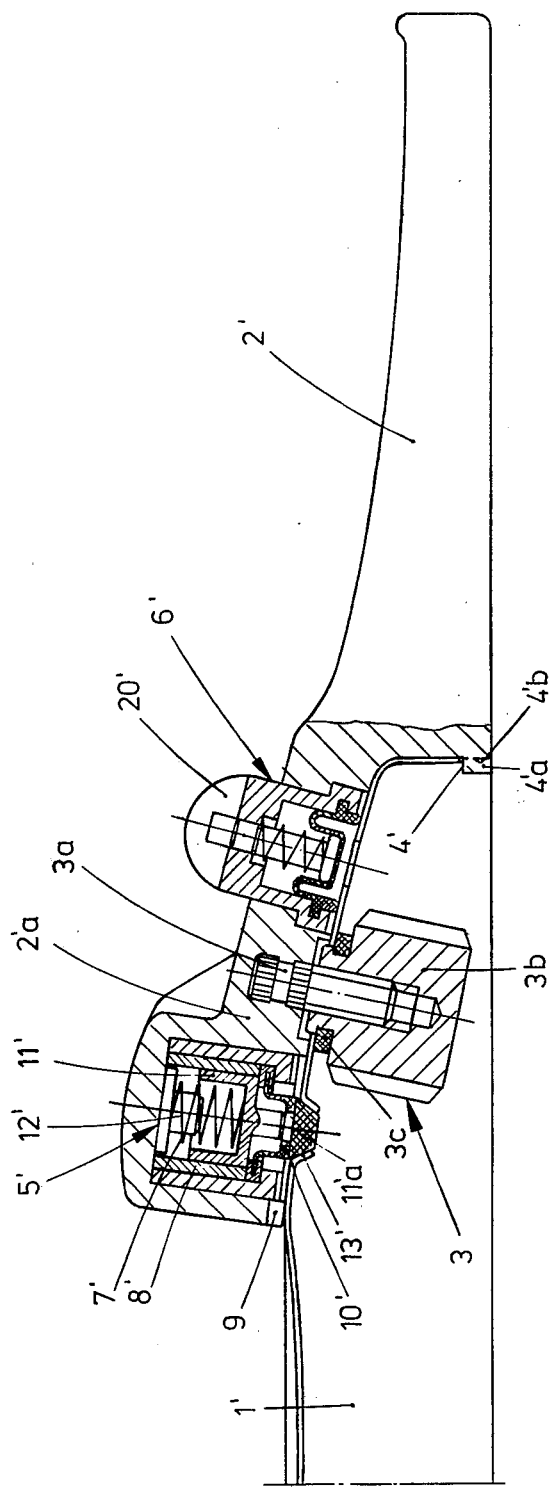
Figure 3:
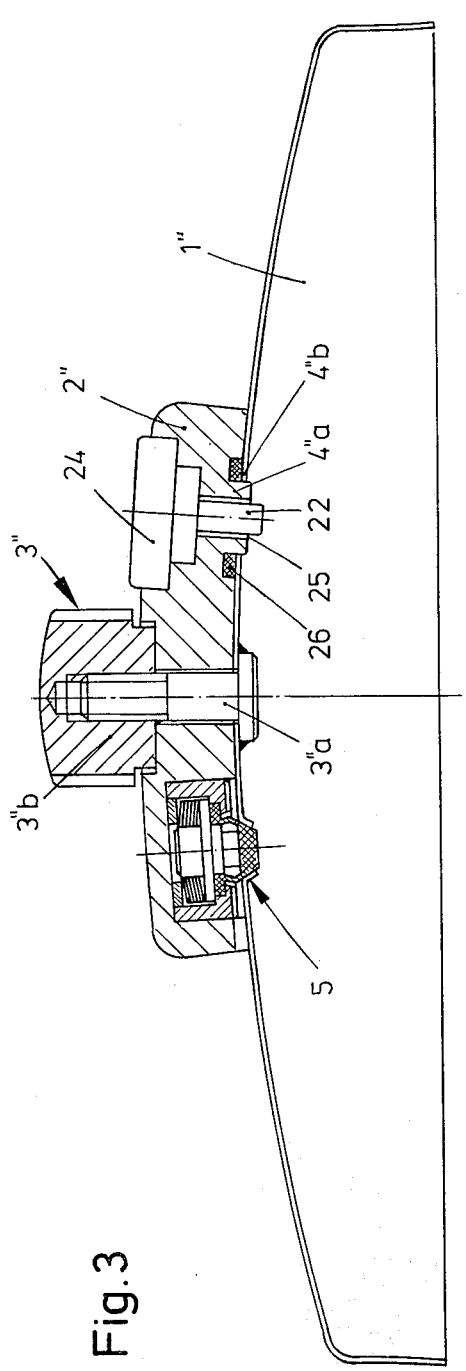
Figure 4:
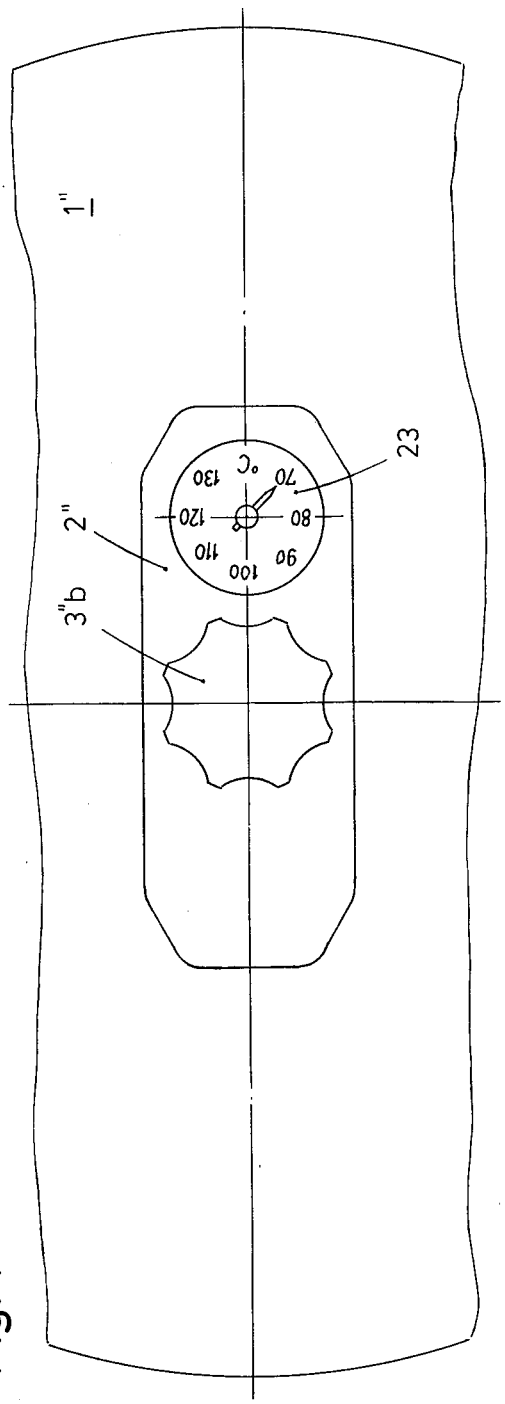

Several embodiments of a steam pressure cooker according to the invention shall now be described with reference to the accompanying drawings, in which FIG. 1 shows a longitudinal sectional view of a portion of a pressure cooker lid provided with safety and monitoring devices, FIG. 2 shows a view corresponding to FIG. 1 of another embodiment, FIG. 3 shows a sectional view of a lid provided with safety and monitoring devices according to a further embodiment of the invention, and FIG. 4 shows a partial top plan view of the lid shown in FIG. 3.

FIG. 1 shows a portion of a pressure cooker lid 1 having a grip handle 2 attached thereto. Handle 2 has a portion 2a extending over a portion of the top surface of the lid. Handle 2 is releasably attached to lid 1 by means of a fastener element 3 engaging handle portion 2a. A fixing element 4 serves to retain grip handle 2 in its correct position on lid 1. Fastener element 3 is composed of a threaded bolt 3a welded into handle portion 2a, and a nut 3b adapted to be threaded onto bolt 3a from the inside of lid 1 and carrying a ring seal 3c retained in a neck portion. Fixing element 4 comprises a pin 4a projecting from the periphery of lid 1 for engagement with a retainer bore 4b in grip handle 2.

The handle portion 2a extending over the top surface of lid 1 constitutes a retainer body for a safety valve 5 and a pressure indicator 6.

Safety valve 5 is located in a cavity 7 of retainer body 2a opening towards the top surface of lid 1. Cavity 7 is lined with a bushing 8 communicating with atmosphere through an outlet passage 9 in retainer body 2a. Attached to bushing 8 is an annular rim 10a of a substantially cup-shaped diaphragm 10 the reinforced bottom portion 10b of which forms a poppet valve member. The interior surface of bottom portion 10a is engaged by a valve plunger 11 biased by a spring 12 located within bushing 8. Valve plunger 11 biases bottom portion 10b of diaphragm 10 into engagement with a valve seat 13 formed by an inwardly recessed opening in lid 1. Cavity 7 is sealed by diaphragm 10 with the valve closed and opened as well as with the grip handle removed from the lid.

Pressure indicator 6 has a housing in the form of a bushing 14 fixedly inserted in retainer portion 2a so as to project above its upper surface. Adjacent the top surface of lid 1 bushing 14 is formed with a cavity 15 tightly sealed by a diaphragm 16 fixedly attached to bushing 14. Within the top portion of bushing 14 projecting above retainer body 2a, cavity 15 narrows down to a tubular guide bore 17 for an indicator pin 18. A heat portion 18a of indicator pin 18 located within cavity 15 is biased into engagement with diaphragm 16 by a compression spring 19. The upper end of cavity 15 is sealingly closed by a transparent cap 20 fixedly connected to the top portion of bushing 14 projecting above retainer body 2a. The spring-biased head portion 18a of pin 18 is operative to bias diaphragm 16 into engagement with an opening 21 formed in lid 1. Pressure indicator 6 operates as follows: In the rest position, i.e. with the lid removed from the cooker or attached thereto under zero pressure conditions, diaphragm 16 keeps lid opening 21 tightly sealed. Increasing pressure within the cooker acts on diaphragm 16 through lid opening 21 so as to lift indicator pin 18 against the force exerted thereon by spring 19. This causes the upper end of pin 18 to be extended from the upper end of guide bore 17, so that pressure indicating markers provided thereon may be observed through transparent cap 20. In this position, air or steam from the interior of the cooker may escape through opening 21, but only into a small chamber defined by diaphragm 16 outside of cavity 15. Under these conditions, any substantial contamination of this chamber is not to be feared. With the grip handle removed from the lid, the potentially contaminated area is defined by the outer surface of the diaphragm, permitting it to be readily cleaned. Removal of the grip handle from the lid is carried out in a simple manner by unscrewing nut 3b. Reassembly is carried out in an equally simple manner by a reversed procedure.

FIG. 2 shows a sectional view corresponding to FIG. 1 of another embodiment of a pressure cooker lid 1'. A grip handle 2' having a portion 2'a extending over a portion of lid 1' is attached thereto in the same manner as described with reference to FIG. 1 by means of a threaded bolt 3a, a nut 3b, and a sealing ring 3c. In the following description only the differences of FIG. 2 to the embodiment shown in FIG. 1 shall be discussed. Valve plunger 11' of safety valve 5' has its end facing away from valve seat 13' formed as a cup-shaped seat for retaining the coiled compression spring 12'. At its end facing towards valve seat 13', valve plunger 11' carries a valve cone 11'a cooperating with seat 13' in lid 1'. Diaphragm 10' surrounds plunger 11' in the manner of a collar adjacent the rear side of valve cone 11'a and has its free edge fixedly attached to bushing 8' so as to seal cavity 7' of safety valve 5' in the same manner as in FIG. 1.

The pressure indicator 6' is distinguished from the embodiment of FIG. 1 mainly by the shape of its transparent cap 20'.

The lid of FIG. 2 is further distinguished from that of FIG. 1 by the design of the fixing element 4'. Grip handle 2' in this case is formed with a projection 4'a for egagement with an opposite recess 4'b in lid 1.

FIGS. 3 and 4 show a further embodiment of the invention comprising a lid 1'' with a retainer body for the safety and monitoring devices in the form of a lid handle 2'' located at its center. The fastener element 3'' is composed of a threaded bolt 3''a welded to lid 1'' to project upwardly therefrom, and a nut 3''b non-separably connected to lid handle 2'' in a manner not shown.

Lid handle 2'' contains a safety valve 5 of the type already described with reference to FIG. 1 and a temperature indicator comprising a temperature sensor 22 operatively connected to a temperature display 23 on top of a housing 24 fixedly connected to lid handle 2'''. Temperature sensor 22 is located in a hollow stud 4''a integrally formed with lid handle 2'' and projecting through an opening 4''b in lid 1''. In cooperation with opening 4''b stud 4''a forms the fixing element for lid handle 2''. The bore of stud 4''a is lined with a seal 25. Opening 4''b is surrounded by an annular seal 26 engaging the outer surface of lid 1''.

As in the embodiments of FIGS. 1 and 2, the safety and monitoring devices are fixedly installed in lid handle 2''. For cleaning the contacting surfaces between lid handle 2'' and lid 1'', the handle may be bodily removed by unscrewing nut 3''b and reattached in a corresponding manner, no further disassembly being required.

The invention is not restricted to the embodiments described. Particulars of the safety and monitoring devices according to the invention, such as the configuration of the bushings, plungers and springs, may be varied within a wide range. The essential feature is their fixed installation and sealing.

I claim:

1. A steam pressure cooker having a lid and safety and monitoring devices, such as a safety valve, a pressure indicator and/or regulating valve disposed at least partially within sealed cavities of a retainer body, particularly of a grip member or a central housing, said retainer body being releasably attached to said lid by means of a sealed fastener element, characterized in that the components of all safety (5) and monitoring devices (6) are located in cavities (7 and 15, respectively) formed in said retainer body (2a) and sealed against the interior of the cooker, and in that said fastener element (3) is releasable independently of the remaining components.

2. A pressure cooker according to claim 1, characterized in that diaphragms (10 and 16, respectively) are provided for sealing each of said safety (5) and monitoring devices (6).

3. A pressure cooker according to claim 2, characterized in that in comprises a safety valve (5) including a diaphragm (10) fixedly connected to said retainer body (2a) and adapted to be brought into pressure engagement with a valve seat (13) by means of a valve plunger (11) slidably disposed in said sealed cavity (7) and biased by a force storage means (12).

4. A pressure cooker according to claim 3, characterized in that said valve seat (13) is formed by a recessed opening in said lid (1).

5. A pressure cooker according to claim 3 or 4, characterized in that said diaphragm (10) is fixedly connected to a bushing member (8) fixedly inserted in said retainer body (2a) and forming said cavity (7).

6. A pressure cooker according to claim 5, characterized in that said valve plunger (11) and said force storage means (12) are located within said bushing (8).

7. A pressure cooker according to claim 3, characterized in that said diaphragm (10') is fixedly located on a side of a valve cone (11'a) facing away from the interior of said cooker.

8. A pressure cooker according to any of claims 1 to 7, characterized by comprising a pressure indicator (6) located adjacent the outer side of said lid (1) in a cavity (15) of said retainer body (2a) sealed by a diaphragm (16), said diaphragm communicating with the interior of the cooker through an opening (21) of said lid and being biased into engagement therewith by a spring-biased indicator pin (18) located in said cavity (15) so as to transmit the interior pressure of the cooker thereto.

9. A pressure cooker according to claim 8, characterized in that said diaphragm (16) is retained in pressure engagement with said lid (1) by said fastener element (3) so as to seal said lid opening (21) against atmosphere.

10. A pressure cooker according to claims 8 or 9, characterized in that said indicator pin (18) is slidably guided in a bushing (14) fixedly inserted in said retainer body (2a) and closed by said diaphragm (16).

11. A pressure cooker according to claim 10, characterized in that said bushing (14) is closed by a transparent cap (20) at the upper side of the lid.

12. A pressure cooker according to any of claims 1 to 11, characterized by comprising a temperature sensor (22) projecting into the interior of the cooker, indicator means (23) at the outer side of the lid, and a seal (26) cooperating with a recess (4''b) facing towards the interior of the cooker.

13. A pressure cooker according to claim 12, characterized in that said temperature sensor (22) is guided in a hollow stud member (4''a) extending through an opening (4''b) of said lid (1'') to act as a fixing element (4'').

14. A pressure cooker according to any of claims 1 to 13, wherein said fastener element comprises a threaded bolt and a nut, characterized in that said bolt (3a) is fixedly connected to said retainer body (2a), the nut (3b) including a seal (3c) being adapted to be threaded thereonto from the interior of the cooker.

15. A pressure cooker according to any of claims 1 to 13, wherein said fastener element comprises a threaded bolt and a nut, characterized in that said bolt (3''a) is fixedly attached to said lid (1'') so as to project outwards therefrom, said nut (3''b) being non-separably connected to said retainer body (2''a).

* * * * *